US008231369B2

(12) United States Patent
Rajala et al.

(10) Patent No.: US 8,231,369 B2
(45) Date of Patent: Jul. 31, 2012

(54) DEVICE AND METHOD FOR PRODUCING NANOPARTICLES

(75) Inventors: Markku Rajala, Vantaa (FI); Kai Asikkala, Helsinki (FI); Anssi Hovinen, Espoo (FI)

(73) Assignee: Beneq Oy, Vantaa (FI)

( * ) Notice: Subject to any disclaimer, the term of this patent is extended or adjusted under 35 U.S.C. 154(b) by 280 days.

(21) Appl. No.: 12/443,902

(22) PCT Filed: Oct. 24, 2006

(86) PCT No.: PCT/FI2006/050456

§ 371 (c)(1),
(2), (4) Date: Apr. 1, 2009

(87) PCT Pub. No.: WO2008/049954

PCT Pub. Date: May 2, 2008

(65) Prior Publication Data

US 2009/0317504 A1 Dec. 24, 2009

(51) Int. Cl.
*B29B 9/12* (2006.01)

(52) U.S. Cl. .................... 425/7; 425/6; 425/10; 264/12; 75/338; 239/8

(58) Field of Classification Search .................. 425/6, 7, 425/10; 264/3.4, 5, 12, 15, 423; 75/10.19, 75/331, 338, 345, 346; 239/8, 9, 10
See application file for complete search history.

(56) References Cited

U.S. PATENT DOCUMENTS

| | | | | |
|---|---|---|---|---|
| 3,899,573 | A * | 8/1975 | Shaw et al. | 423/337 |
| 4,148,628 | A * | 4/1979 | Fukunishi et al. | 75/10.19 |
| 4,217,133 | A * | 8/1980 | Goto et al. | 75/312 |
| 4,246,208 | A * | 1/1981 | Dundas | 264/14 |
| 4,534,917 | A * | 8/1985 | Walz | 75/338 |
| 4,731,517 | A * | 3/1988 | Cheney | 219/121.59 |
| 5,277,977 | A * | 1/1994 | Tokuoka et al. | 428/402 |
| 5,294,242 | A * | 3/1994 | Zurecki et al. | 75/345 |
| 5,366,204 | A * | 11/1994 | Gigliotti et al. | 266/202 |
| 5,429,657 | A * | 7/1995 | Glicksman et al. | 75/351 |
| 5,595,765 | A * | 1/1997 | Christensen et al. | 425/7 |
| 5,599,511 | A * | 2/1997 | Helble et al. | 422/232 |
| 5,601,781 | A * | 2/1997 | Miller et al. | 266/202 |
| 5,876,683 | A | 3/1999 | Glumac et al. | |
| 6,193,936 | B1 * | 2/2001 | Gardner et al. | 422/186 |
| 6,264,742 | B1 * | 7/2001 | Vekris et al. | 117/204 |
| 6,398,125 | B1 * | 6/2002 | Liu et al. | 239/13 |
| 6,911,618 | B1 * | 6/2005 | Chiwata | 219/121.38 |
| 6,939,389 | B2 * | 9/2005 | Mooney et al. | 75/346 |
| 7,262,384 | B2 * | 8/2007 | Jackson | 219/121.43 |

(Continued)

FOREIGN PATENT DOCUMENTS

EP 0 662 521 B1 10/1999

(Continued)

*Primary Examiner* — Joseph Del Sole
*Assistant Examiner* — Seyed Masoud Malekzadeh
(74) *Attorney, Agent, or Firm* — Oliff & Berridge, PLC

(57) ABSTRACT

The invention relates to a device and a method for producing nanoparticles, in which method starting materials for nanoparticles are mixed at least as liquid droplets and optionally also as gases and/or vapors with at least combustion gases in a premixing chamber and the mixture is separated for liquid drops larger than size d, whereafter the mixture is conducted to at least one burner, in which the combustion gases are ignited such that a heavily mixing flame is generated, in which the starting materials react and optional solvents evaporate and generate through nucleation and/or sintering and/or agglomeration particles having a diameter of 1 to 1000 micrometers.

13 Claims, 7 Drawing Sheets

U.S. PATENT DOCUMENTS

| | | | | |
|---|---|---|---|---|
| 7,621,976 | B2 * | 11/2009 | Hampden-Smith et al. | 75/338 |
| 7,625,420 | B1 * | 12/2009 | Kodas et al. | 75/252 |
| 2002/0031658 | A1 | 3/2002 | Chow et al. | |
| 2004/0178530 | A1 * | 9/2004 | Yadav | 264/5 |
| 2006/0166057 | A1 | 7/2006 | Kodas et al. | |
| 2008/0268246 | A1 * | 10/2008 | Stark et al. | 428/402 |

FOREIGN PATENT DOCUMENTS

| | | | |
|---|---|---|---|
| FI | 20050595 | A | 12/2006 |
| WO | WO 00/27523 | A1 | 5/2000 |

* cited by examiner

DEVICE AND METHOD FOR PRODUCING NANOPARTICLES

FIELD OF THE INVENTION

The invention relates to a device in accordance with the preamble of claim 1 and, in particular, to a device for producing nanoparticles, the device producing liquid droplets containing starting materials for nanoparticles, which liquid droplets are conducted to a thermal reactor in which the nanoparticles are formed from the liquid droplets.

DESCRIPTION OF PRIOR ART

Nanoparticles, i.e. particles having a size of 1 to 1000 nanometers, have been found to have a plurality of significant applications, such as catalytic surfaces, self-cleaning and antibacterial products, glass dyeing, sunscreen lotions and manufacturing of optical components, such as an optical fibre, etc. Feasible production of nanoparticles is a crucial factor in view of the feasible use of these applications. Relatively narrow size distribution (mono-dispersivity), anti-agglomeration and homogeneity are required of the nanoparticles. Nanoparticle production should be readily convertible from laboratory-scale production to industrial-scale production. Nanoparticles may be produced both by wet chemical processes and by vapour phase processes, of which the vapour phase processes are generally simpler and more readily scalable than the wet processes. The vapour phase processes, also known as aerosol reactor processes, include flame reactors, hot-wall reactors, plasma reactors, gas condensation methods, laser ablation and spray pyrolysis among other things. The flame reactor and the spray pyrolysis process represent the prior art essential to the present invention. The prior art is set forth, for instance, in KONA, 2004, No. 22, L. Mädler, "Liquid-fed Aerosol Reactors for One-step synthesis of Nano-structured Particles", p. 107-120. The article is briefly summarized below to present the prior art.

The spray processes for producing nanoparticles differ from one another mainly in the manner how the thermal energy necessary for pyrolysis is introduced into the process. Introduction of the thermal energy affects, for instance, the maximum temperature, temperature profile and residence time. The four principal methods for spray processes in nanoparticle production include spray pyrolysis in tubular reactor (SP), vapour flame reactor spray pyrolysis (VFSP), emulsion combustion method (ECM) and flame spray pyrolysis (FSP). Of these methods the SP employs a hot-wall reactor as the thermal reactor and therefore it is not relevant to the present invention. ECM and FSP use oil and exothermic liquid as fuel and therefore they are not relevant in connection with the present invention.

The vapour flame reactor uses as heat source a thermal reactor provided by means of combustion gases. A considerably higher temperature and a shorter residence time are the advantages of the flame over the hot-wall reactor. In the VFSP reactor the raw material is vaporized with a bubbler or an evaporator and the vapour is conducted to the flame provided by means of the combustion gases. The vapours may be mixed with the combustion gases either upstream of a pre-mixed burner or outside the burner. The raw materials react in the flame and form particles. Scarcity of raw materials is a disadvantage of the process. Only few elements have compounds with sufficiently high vapour pressure for the process.

The process has been further developed to include modifications in which liquid raw materials are atomized and fed into the flame. These modifications are set forth in U.S. Pat. No. 3,883,336 A, U.S. Pat. No. 5,876,683 A, U.S. Pat. No. 6,447,848 A, in US patent application U.S. 2002/0031658 A1 and in Finnish patent FI98832 B.

U.S. Pat. No. 3,883,336 discloses an apparatus, in which silicon tetrachloride is passed in a form of mist into a flame spray by means of oxygen acting as a carrier gas. Said publication further discloses spraying aerosol into the flame of the flame spray from outside to produce glass. Said apparatus has poor efficiency and passing silicon tetrachloride as vapour into the apparatus by means of a carrier gas is slow, because if the amount of silicon tetrachloride is excessive in relation to the carrier gas, it nucleates into larger droplets, and consequently, sufficiently small particles will not be obtained by spraying.

U.S. Pat. No. 5,876,683 discloses a method for the production of nanomaterial. The disclosed method produces nanoparticles from gaseous starting materials at a reduced pressure, typically of 1 to 50 mbar. The method being limited to the use of gaseous starting materials excludes quite a large number of starting materials and the use of organometals as starting materials makes the process expensive.

U.S. Pat. No. 5,958,361 discloses a method for the production of nanosized material by a spray pyrolysis process. In the process a starting material dissolved in an organic solvent is fed into the flame, where the substances react and produce nanosized particles. Combustion of the solvent produces the majority of the energy required for the reactions. The patent does not disclose a method for droplet formation of liquid starting materials into a premixing chamber, but droplets are formed directly into the flame, whereby the process is substantially less controllable than in the present invention.

U.S. Pat. No. 6,447,848 discloses a method of producing fine-structured coatings by employing thermal spraying, in which coating raw materials are fed in liquid form into the flame. The patent does not disclose a method for droplet formation of liquid starting materials into a premixing chamber, but liquid starting materials are fed directly into the flame, whereby the process is substantially less controllable than in the present invention. The invention of said patent has been further developed in US patent application 2002/0031658, which does not describe droplet formation into a premixing chamber either.

Finnish patent FI98832 discloses a method and an apparatus, in which a substance to be sprayed is conducted in liquid form into the flame and atomized by means of a gas substantially in the vicinity of the flame such that atomization and flame generation take place in the same device. Further, said publication sets forth that the device comprises means for conducting a liquid substance into the flame and means for conducting the gas into the liquid to be sprayed such that the gas sprinkles the liquid to be sprayed into droplets substantially in the vicinity of the flame, whereby droplets are formed in the same device with the flame. Speeds of the sprinkling gases and the combustion gases to be used in said method may differ considerably from one another, which may cause refluxes in the flame to be generated and fouling and even clogging of the burner resulting from the refluxes. Simultaneous sprinkling of a plurality of different liquids is difficult in said method. The scalability of the method and the apparatus is cumbersome, because each burner requires a separate adjustment of gas stream rates to enable good control of atomization and flame generation.

SUMMARY OF THE INVENTION

The object of the invention is to provide a device such that the above problems can be solved. This is achieved with the device in accordance with the characterizing part of claim 1, which is characterized in that droplets atomized from at least one liquid starting material and combustion gases and/or oxidizing gases forming a thermal reactor are intermixed prior to conducting the mixture into the thermal reactor.

The preferred embodiments of the invention are disclosed in the dependent claims.

The main object of the present invention is to provide a device by which particles having a size in the order of nanometers (1 to 1000 nm) can be produced fast and economically. In particular, the object of the invention is to provide a device by which it is possible to produce multicomponent nanoparticles.

In accordance with the invention the device uses liquid raw materials that are mostly solutions of metallic salts, the liquid is atomized into tiny droplets into a premixing chamber, mixed in the premixing chamber with at least combustion gases, the mixture is conducted to a classifier that separates the mixture for droplets having an aerodynamic diameter that exceeds size d, the mixture containing droplets smaller than the diameter d are conducted to a burner, a flame is generated and in the flame the raw materials convert to nanoparticles whose composition may be different from that of the raw materials.

In accordance with the invention, instead of the flame, it is also possible to use a thermal reactor other than the flame, such as plasma, hot-wall reactor, laser or the like, as the energy source required for nanoparticle formation, in which thermal reactor a premixed gas and liquid droplet mixture is conducted so as to form nanoparticles.

Further in accordance with the invention it is possible to feed into the premixing chamber separately droplets of a variety of different raw materials and/or other nanoparticle raw materials in the form of a gas or vapour, whereby a raw material mixture of multicomponent nanoparticles will be obtained.

Further in accordance with the invention, the device comprises means for atomizing the liquid into droplets, means for conducting the droplets into a premixing chamber, means for conducting combustion and other gases into the premixing chamber, means for mixing the gases and the liquid droplets, means for removing large liquid drops from the mixture, means for conducting the mixture to at least one burner and means for generating a flame.

Further in accordance with the invention, surfaces of the device may be heated. In that case liquid from the droplets drifting onto the device surfaces evaporizes in the gas stream, but salts in the liquid crystallize on the surfaces of the device and do not drift in the gas stream. In this manner it is possible to prevent the liquid deposited on the surfaces from being detached in large drops in the gas stream.

The liquid droplets in the gas stream change size as a result of condensation and evaporation. When the diameter of a liquid droplet exceeds one micrometer, the liquid droplet always behaves approximately in the same manner, irrespective of whether salts are dissolved therein or not (W. C. Hinds, Aerosol Technology, Properties, Behavior and Measurement of Airborne Particles, 2nd Edition (1999), John Wiley & Sons, Inc. New York, in particular p. 278-303).

The change in droplet size for droplets of more than 1 micrometer may be calculated with formula $$\frac{d(d_p)}{dt} = \frac{4D_vM}{R\rho_p d_p}\left(\frac{p_\infty}{T_\infty} - \frac{p_d}{T_d}\right) \quad (1)$$

where $d_p$ is the diameter of a liquid droplet, t is time, $D_v$ is diffusion constant of vapour in the air, M is molecular mass of the liquid, R is gas constant, $\rho_p$ is droplet density, $\rho_\infty$ is vapour pressure at a distance from the liquid droplet, $T_\infty$ is temperature at a distance from the liquid droplet, $p_d$ is vapour pressure on the surface of the droplet and $T_d$ is temperature on the surface of the droplet. If the right side of the equation has a negative value, the droplet reduces. If the value is positive, the droplet becomes larger.

Droplet reduction rate is higher in small particles, i.e. as a result of evaporation small particles disappear faster than greater ones and droplet size distribution becomes wider. This will also result in salt contained in small droplets drying in the channels, which may pose problems for the process to work.

The liquid droplet size is also affected by their agglomeration, the rate of which depends on the droplet density.

Gravitation has a substantial effect on the behaviour of droplets larger than 50 micrometers in diameter. Typically, in the device of the present invention droplets larger than 50 micrometers are not produced into the premixing chamber.

In one embodiment of the device of the invention aerosol flow from the mixing chamber to the burner passes in channels, where evaporation does not occur from the liquid droplet surface, and consequently, droplet size distribution of the droplets produced into the premixing chamber does not become wider as the droplets pass to the burner. Evaporation is prevented by controlling the gas temperature, the temperature of the droplet-forming liquid, the surface temperature of the channels and the vapour pressure of the solvent (relative humidity when water is the solvent).

In one embodiment of the device of the invention aerosol flow from the mixing chamber to the burner passes in channels, where condensation takes place on the surface of the liquid droplets, and consequently, droplet size distribution of the droplets produced in the premixing chamber becomes narrower as the droplets pass to the burner. Condensation is provided by controlling the gas temperature, the temperature of the droplet-forming liquid, the surface temperature of the channels and the vapour pressure of the solvent.

The basic idea of the invention is to allow production of multicomponent, nanosized particles with the device of the invention in an industrial and scalable manner. Further, nanoparticles produced with the device can be utilized in fabrication of a plurality of products, such as in coating or surface modification of glass or ceramic products, or in fabrication of fibre preforms to be produced in the manufacturing process of optical fibres.

In the following, the invention will be described in greater detail to illustrate by means of examples to a person skilled in the art some preferred applications and advantages to be achieved by the invention over the prior art.

BRIEF DESCRIPTION OF THE DRAWINGS

In the following, the invention will be described with reference to the attached drawings, wherein.

DETAILED DESCRIPTION OF THE INVENTION

Figure 1:
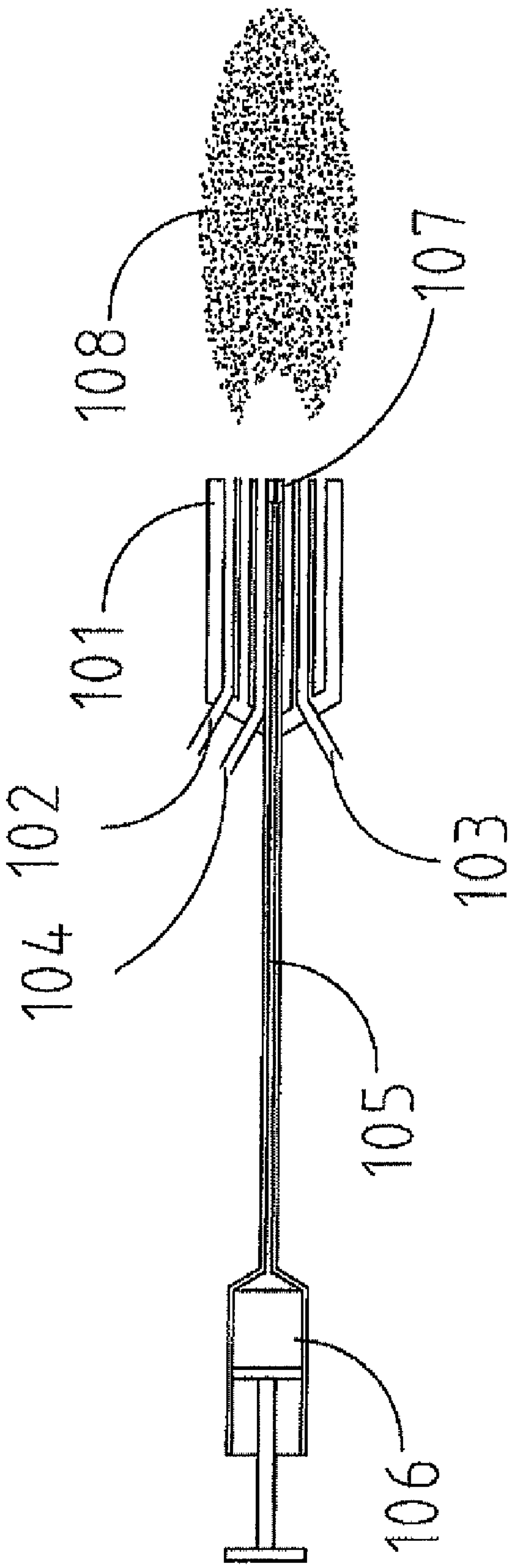
FIG. 1 illustrates schematically the prior art.

FIG. 1 shows prior art of producing nanosized particles, for instance, in the manner disclosed in Finnish patent FI98832. A liquid flame spray 101 provides a flame 108 for spraying a substance to be sprayed. The necessary gases are supplied to the flame spray 101 through gas channels 102, 103 and 104. Through the gas channels 102, 103 and 104 there are supplied combustion gases generating the flame, a sprinkling gas of the liquid to be sprayed and optionally a gas provided for reaction control. The substance to be sprayed is introduced in liquid form into the flame spray 101 through a liquid channel 105. The liquid to be sprayed is transferred through the liquid channel 105 by pumping it with a spray pump 106. At an extremity of the flame spray there is a nozzle 107, in which the combustion gases are ignited to provide a flame and in which the liquid to be sprayed is formed into droplets by means of a sprinkling gas. By means of a gas stream the liquid droplets are conducted to the flame 108, in which the liquid evaporates and metal compounds in the substance to be sprayed form particles 109.

When nanosized particles are produced by the method of FIG. 1 a problem arises that large liquid drops that may be formed in the process do not evaporate completely, and there appears so-called residual particles having a size that exceeds the desired nanoparticle size. Another problem with the method concerned is that it is difficult to produce particles from liquid components that do not mix well together or that react with one another in an undesirable manner, forming a gel, for instance.

Figure 2:
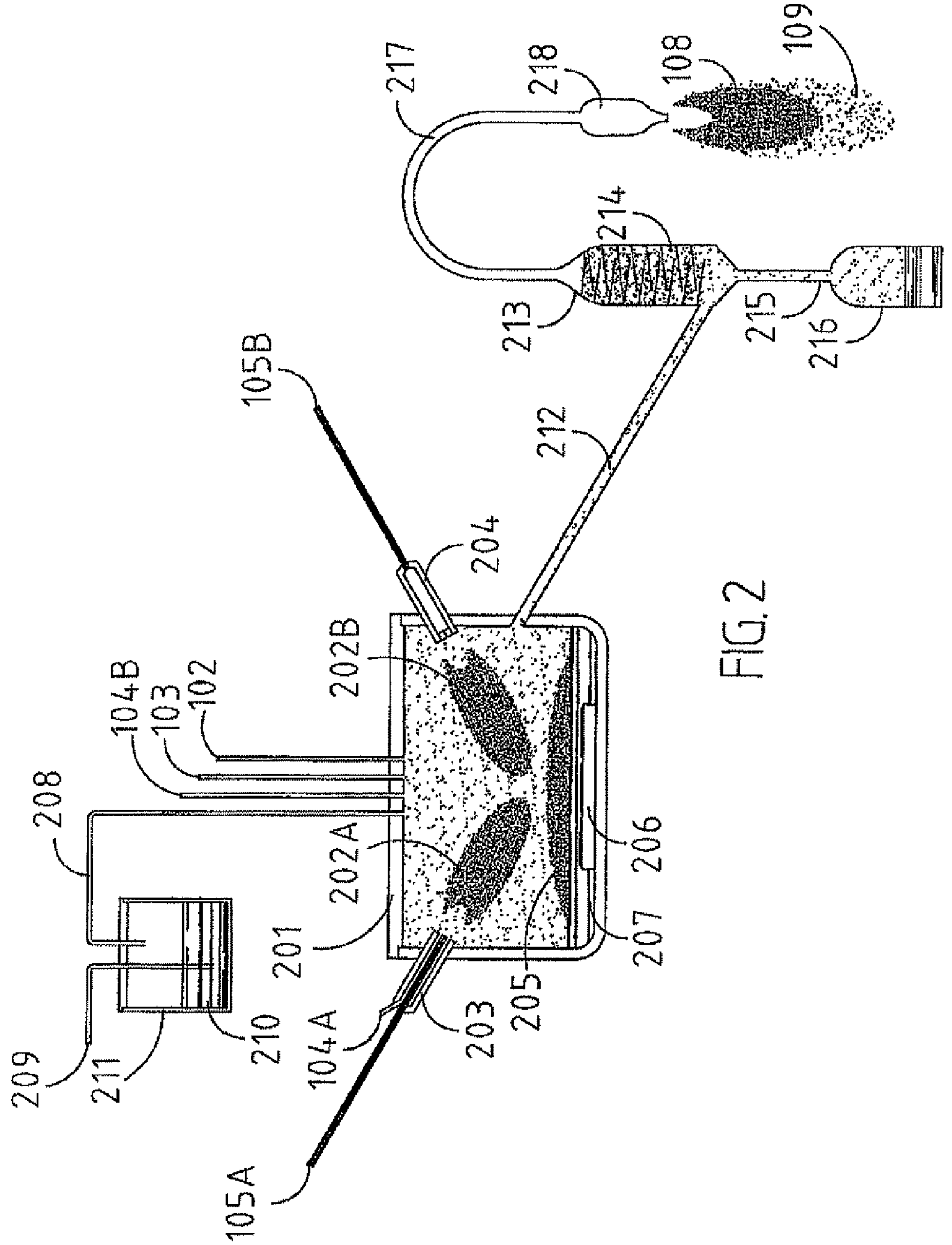
FIG. 2 illustrates schematically a preferred embodiment of the invention.

FIG. 2 shows a preferred embodiment of the present invention. Liquid droplets 202A are atomized into a premixing chamber 201 by using a gas-dispersed atomizer 203, in which liquid feedstock 105A is atomized by means of a combustion gas 104A into tiny droplets 202. Other liquid droplets 202B are atomized into the same premixing chamber 201 by using a pressure-dispersed atomizer 204, wherewith liquid feedstock 105B is atomized into tiny droplets 203. Further, third liquid droplets 205 are atomized into the same premixing chamber 201 by using an atomizer 206 based on a vibrating plate, such as ultra-sound plate, wherewith the liquid source 207 is atomized into tiny droplets 205. Combustion gas is fed into the premixing chamber 201 from channel 104B. The combustion gas may be hydrogen, methane, propane or butane or a combination thereof or a combination of these gases and some other gas. Likewise, an oxygen-carrying gas is fed into the premixing chamber 201 from the channel 103. The oxygen-carrying gas may be air, oxygen or ozone. An inert gas, such as nitrogen or carbon dioxide, is fed from the gas channel 102 into the premixing chamber. A gas that contains at least one raw material for nanoparticles to be produced is fed from the gas channel 15 to the premixing chamber. Vapour that contains at least one raw material for nanoparticles to be produced is fed from the channel 208 into the premixing chamber. The vapour is introduced by feeding gas from the channel 209 through a bubbler bottle 211 containing liquid, whereby vaporized liquid (vapour) passes through the channel 208 into the premixing chamber 201. Liquid droplets, gases and vapours mix efficiently in the premixing chamber 201 forming a homogeneous mixture 212. The mixture is forwarded to a droplet separator 213 which separates the mixture for droplets 214 having a particle size exceeding size d. The liquid contained in the droplets is further conducted via a collector channel 215 into a collector container 216. The droplet separator 213 may be based on, for instance, impaction, air classification, electrical classification, cyclone-based classification or the like. The mixture, from which large liquid drops are removed 217, is conducted to a burner 218. In the burner the mixture is ignited to generate a flame 108. The flame is advantageously turbulent or otherwise such that the mixture will be efficiently mixed. In the flame 108 the liquid components evaporate and the raw materials react to form particles 109.

Figure 3:
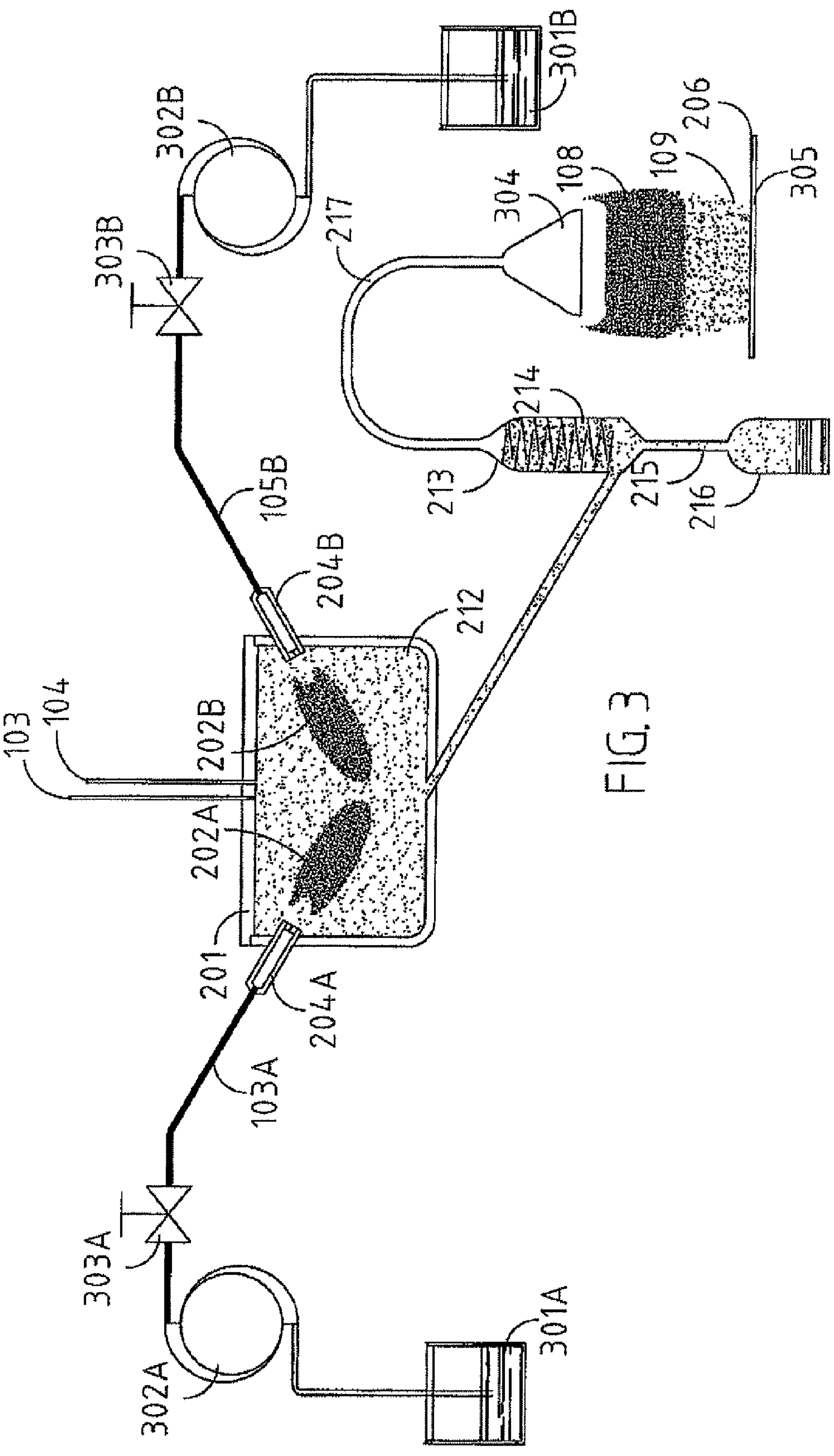
FIG. 3 illustrates an embodiment of the invention, in which nanoparticles are produced by the device of the invention for dyeing flat glass.

FIG. 3 shows a preferred embodiment of the present invention when applied to dyeing of flat glass. At the same time, the figure and the relating description serve as an example of the use of the invention in one application. Liquid droplets 202A and 202B are atomized into the premixing chamber 201 by using two pressure-dispersed atomizers 204A and 204B, wherewith liquid feedstocks 105A and 105B are atomized into tiny droplets. The liquid 301A is sucked with a high-pressure pump 302A and fed further to the pressure-dispersed atomizer 204A. The liquid 301A consists of methanol and cobalt (II) nitrate $Co(NO_3)_2 6H_2O$ dissolved therein, the proportions being 100 ml methanol and 20 g cobalt(II)nitrate. The feed from the high-pressure pump 302A is restricted with a throttle valve or the like 303A to be 50 ml/min. The liquid 301B is sucked with the high-pressure pump 302B and fed further to the pressure-dispersed atomizer 204B. The liquid 301B consists of methanol and calcium nitrate $Ca(NO_3)_2 4H_2O$ dissolved therein, the proportions being 100 ml methanol and 18 g calcium nitrate. Feed from the high-pressure pump 302B is restricted with a throttle valve or the like 3038 to be 50 ml/min. Hydrogen gas is fed into the premixing chamber 201 from the channel 104 at a volume flow rate of 500 l/min. Air is also fed into the premixing chamber 201 from the channel 103 at a volume flow rate of 1250 l/min. The liquid droplets and gases mix efficiently in the premixing chamber 201 and form a homogeneous mixture 212. The mixture is conducted further to a droplet separator 213 that separates the mixture for droplets 214 having a diameter that exceeds the aerodynamic diameter of 10 micrometers. The liquid contained in the droplets is conducted further through a collector channel 215 to a collector container 216. The mixture, from which large liquid drops have been removed 217, is conducted to a burner 304. The burner 304 is a slit nozzle having a width of 1000 mm and a slit width of 20 mm. In the burner the mixture is ignited to generate a flame 108. In the flame 108 the liquid components evaporate and the raw materials evaporate and/or nucleate and/or condense and/or react to form particles 109. These particles are further directed to a surface of flat glass 305 having a temperature that exceeds 600° C. and to which the particles 306 adhere. The particles 306 diffuse and further dissolve in the glass 305 dyeing the glass surface blue.

Figure 4:
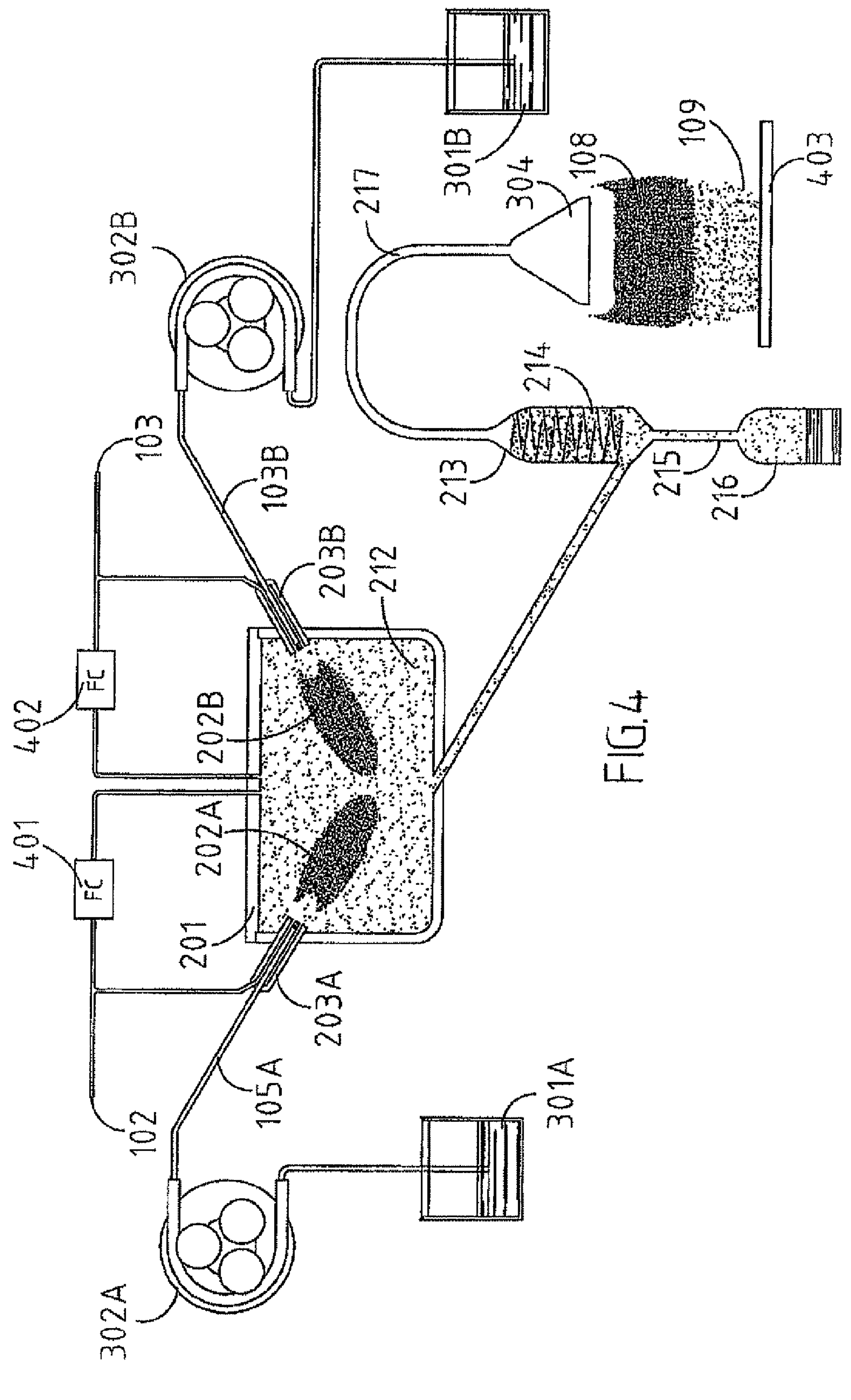
FIG. 4 illustrates an embodiment of the invention, in which nanoparticles are produced by the device of the invention for coating a ceramic plate with a photocatalytic semi-conductor.

FIG. 4 shows a preferred embodiment of the present invention when it is used for producing a photocatalytic surface onto a ceramic plate. At the same time the figure and the relating description serve an example of the use of the invention in one application. Liquid droplets 202A and 202B are atomized into the premixing chamber 201 by using two gas-dispersed atomizers 203A and 203B wherewith liquid feedstocks 105A and 105B are atomized into tiny droplets 202A and 202B. The liquid 301A is fed with a hose pump 302A to the gas-dispersed atomizer 203A. The liquid 301A consists of methanol and tetraethyl ortho titanate $Ti(OC_2H_5)_4$ (TEOT) dissolved therein, the mixing proportions being 1:1. Volume flow rate of the liquid is regulated with the hose pump 302A to be 10 ml/min. The liquid 301B is fed with the hose pump 302B to the gas-dispersed atomizer 105B. The liquid 301B consists of methanol and silver nitrate $AgNO_3$ dissolved therein, the mixing proportions being 100 ml methanol and 10 g silver nitrate. Volume flow rate of the liquid is regulated with the hose pump 302B to be 5 ml/min. Hydrogen gas is fed into the premixing chamber 201 at the volume flow rate, regulated with a flow rate regulator 401, of 40 l/min from the channel 102 which further joins with the gas channel of the gas-dispersed atomizer 203A prior to being conducted into the premixing chamber 201. In the same way, oxygen is fed into the premixing chamber 2011 at a volume flow rate, regulated with a flow rate regulator 402, of 20 l/min from the channel 103 which further joins with the gas channel of the gas-dispersed atomizer 203B prior to being conducted into the premixing chamber 201. The liquid droplets 202A and 202B and the gases mix efficiently in the premixing chamber 201 and form a homogeneous mixture 212. The mixture is further conducted to a droplet separator 213 which separates the mixture for droplets 214 having a diameter that exceeds the aerodynamic diameter of 10 micrometers. Liquid contained in the separated droplets is further conducted through a collector channel 215 to a collector container 216. The mixture, from which large liquid drops have been removed 217, is conducted to a burner 304. The burner 304 is a slit nozzle having a width of 300 mm and slit width of 5 mm. In the burner 304 the mixture is ignited to generate a flame 108. In the flame 108 the liquid components evaporate and the raw materials react and form particles 109. These particles are further directed onto the surface of a ceramic plate, on which they adhere forming a photocatalytic coating on the surface of the plate.

Figure 5:
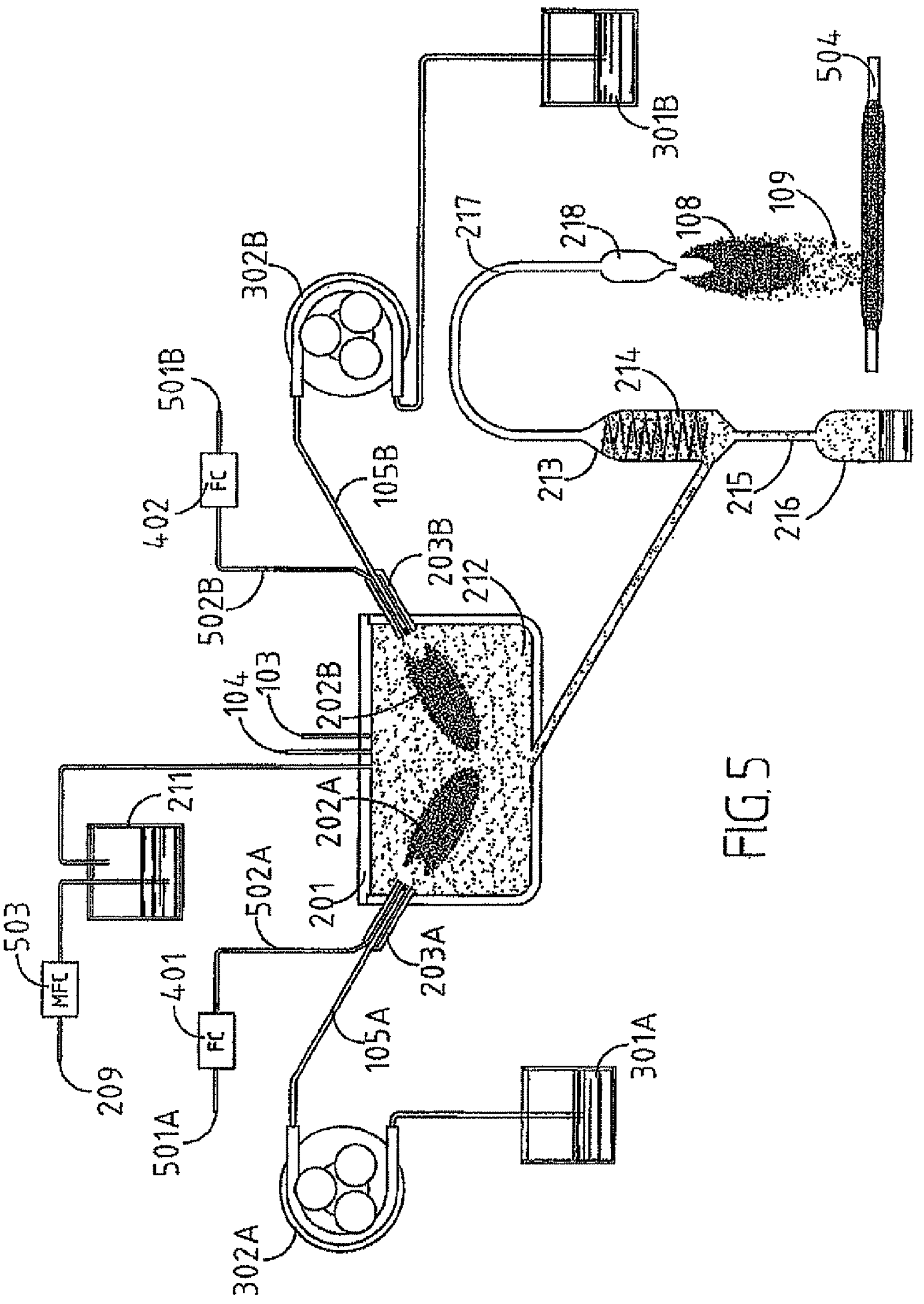
FIG. 5 illustrates an embodiment of the invention, in which nanoparticles are produced by the device of the invention for fabrication of an optical fibre preform.

FIG. 5 shows a preferred embodiment of the present invention, when it is used for producing porous fibre preforms necessary for the manufacture of active optical fibres. At the same time the figure and the relating description serve as an example of the use of the invention in one application. Liquid droplets 202A and 202B are atomized into the premixing chamber 201 by using two gas-dispersed atomizers 203A and 203B wherewith liquid feedstocks 105A and 105B are atomized into tiny droplets. Compressed air is used as the atomizing gas 501A and 501B, which is conducted into gas channels 502A and 502B of the atomizing nozzle via flow rate regulators 401 and 402. The liquid 301A is fed with a hose pump 302A to the gas-dispersed atomizer 203A. The liquid 301A consists of methanol and aluminum nitrate $Al(NO_3)_2 9H_2O$, the mixing proportions being 20 g aluminum nitrate to 100 ml methanol. Volume flow rate of the liquid is regulated with the hose pump 302A to be 12 ml/min. The liquid 301B is fed with the hose pump 302B to the gas-dispersed atomizer 203B. The liquid 301B consists of methanol and erbium nitrate $Er(NO_3)_2 5H_2O$ dissolved therein, the mixing proportions being 100 ml methanol and 2 g erbium nitrate. Volume flow rate of the liquid is regulated with the hose pump 302B to be 12 ml/min. Oxygen 209 acting as a carrier gas is passed through the mass flow regulator 503 to a bubbler 211. Silicon tetrachloride $SiCl_4$ 210 in the bubbler 211 vaporizes into the carrier gas 209 and passes with the carrier gas 208 into the premixing chamber 201. Flow rate of the carrier gas is 500 ml/min and the temperature of the bubbler is 30° C. Hydrogen gas is fed into the premixing chamber 201 from the channel 104 at a volume flow rate of 30 l/min. In the same way, oxygen is fed into the premixing chamber 201 at a volume flow rate of 15 l/min from the channel 103. The droplets, vapour and gases mix efficiently in the premixing chamber 201 and form a homogenous mixture 212. The mixture is further conducted to the droplet separator 213 that separates the mixture for droplets 214 having a diameter that exceeds the aerodynamic diameter of 8 micrometers. The liquid contained in the droplets is further conducted through the collector channel 215 to the collector container 216. The mixture, from which large liquid drops have been removed 217, is passed to a burner 218. The burner 218 is a round nozzle having a diameter of 2 mm. In the burner 218 the mixture is ignited to generate a flame 108. In the flame 108 the liquid components evaporate and the raw materials react and form particles 109. The particle composition is $SiO_2$—$Al_2O_3$—$Er_2O_3$ the proportions being 100-10-1. These particles are further directed onto the surface of a mandrel 504, on which the particles adhere and form a porous layer of glass. After build-up the mandrel 504 is removed, and a porous glass preform is obtained as a result.

Figure 6:
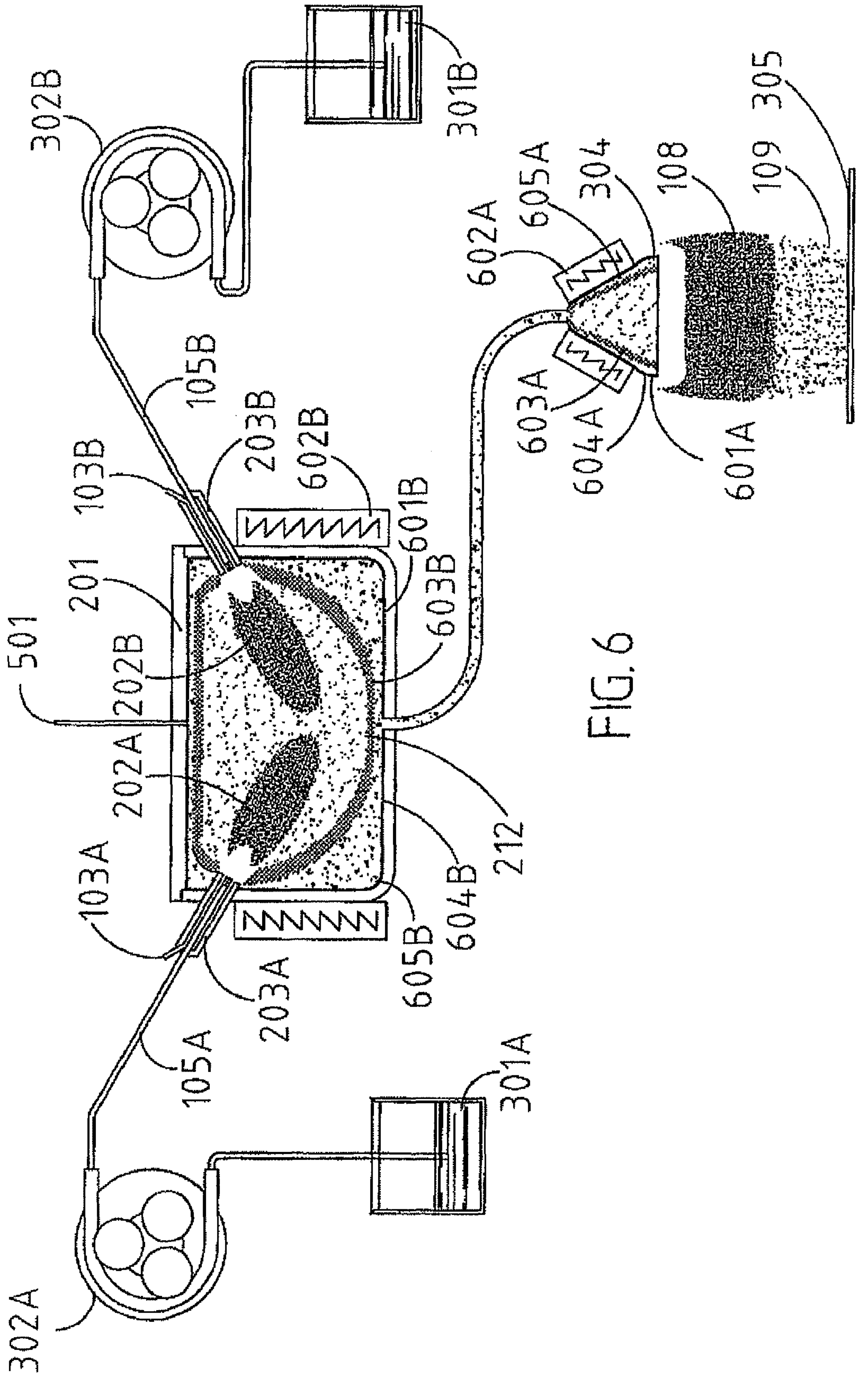
FIG. 6 illustrates an embodiment of the invention, in which the surface of the device is heated such that large drops are prevented from being carried to a downwardly directed burner.

FIG. 6 shows a preferred embodiment of the present invention when it is used in a downwardly directed burner for producing nanoparticles for coating. At the same time the figure and the relating description serve as an example of the use of the invention in one application. Liquid droplets 202A and 202B are atomized into the premixing chamber 201 by using two gas-dispersed atomizers 203A and 203B wherewith liquid feedstocks 105A and 105B are atomized into tiny droplets 202A and 202B. The liquid 301A is fed with the hose pump 302A to the gas-dispersed atomizer 203A. The liquid 301A consists of methanol and copper nitrate $Cu(NO_3)_2 3H_2O$ dissolved therein, the mixing proportions being 30 g copper nitrate to 100 ml methanol. Volume flow rate of the liquid is regulated with the hose pump 302A to be 8 ml/min. The liquid is fed with the hose pump 302B to the gas-dispersed atomizer 203B. The liquid 301B is tetraethyl ortho silicate TEOS. Volume flow rate of the liquid is regulated with the hose pump 302B to be 20 ml/min. Hydrogen gas is fed into the premixing chamber 201 at a mass flow rate of 30 l/min from the channels 103A and 103B which serve at the same time as disperse gas channels of the gas-dispersed atomizers 105A and 105B. In the same way, air is fed into the premixing chamber 201 from the channel 501 at a volume flow rate of 75 l/min. The liquid droplets and gases mix efficiently in the premixing chamber 201 and form a homogeneous mixture 212. The mixture is further conducted to a burner 304. The burner 304 is a slit nozzle having a width of 200 mm and a slit diameter of 1 mm. The surfaces 601A and 601B of the burner 304 and the premixing chamber 201 are heated with electric heaters 602A and 602B to a temperature of 120° C. Thus methanol 603A and 603B evaporates from particles 605A and 605B drifted on the surfaces 601A and 601B, and salts 604A and 604B contained in the liquid adhere to the surfaces. Thus the liquid adhering to the surface is prevented from flowing/running as large drops off the burner 304. In the burner 304 the mixture is ignited to generate a flame 108. In the flame 108 the liquid components evaporate and the raw materials react and form particles 109. The particles are further directed to the surface of flat glass 305, to which the particles 109 adhere. The particles diffuse, dissolve and mix in the surface of the flat glass dyeing it turquoise.

Figure 7:
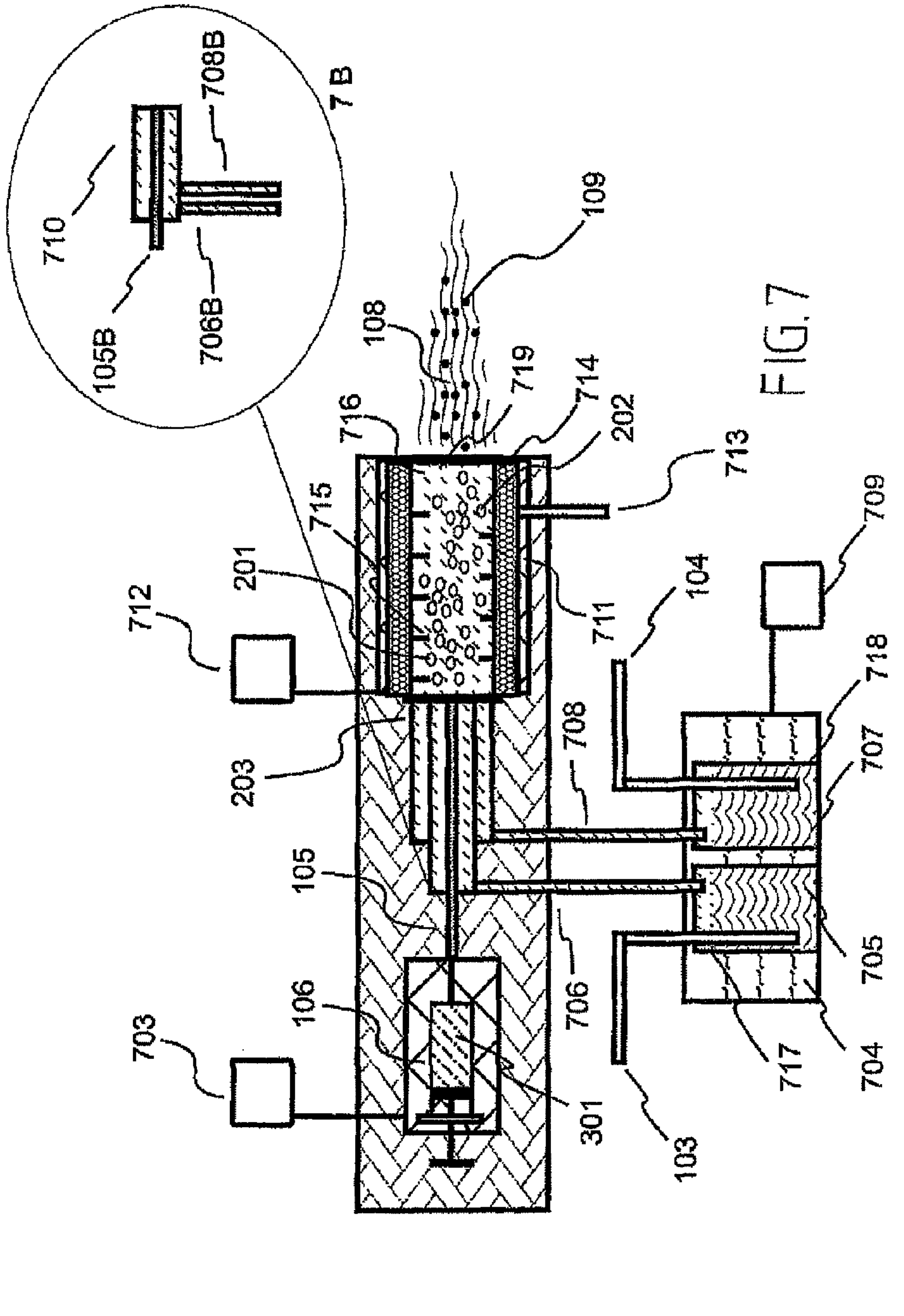
FIG. 7 illustrates the device of the invention, in which particular interest has been paid to control the liquid droplet to be used in generating nanoparticles.

FIG. 7 shows schematically a device in accordance with the present invention, which device caters for several details affecting the control of droplets to be produced. Liquid droplets 202 are atomized into a premixing chamber 201 with a pressure-dispersed atomizer 203. The liquid 301, which contains metallic salts serving as raw materials for nanoparticles and a solvent thereof, is fed with a spray pump 106 into a channel 105. The liquid is atomized with the pressure-dispersed atomizer 203 by means of hydrogen gas. Prior to introduction to a sprinkler 203 the hydrogen gas is passed through a bubbler 717. The bubbler 717 contains the same solvent 705 as the one in which the salts serving as nanoparticle raw materials have been dissolved. Solvent 705 vaporizes in the hydrogen gas 103 passing through the bubbler 717. The amount of vaporizing solvent depends on the volume flow of hydrogen and the temperature of the bubbler 717. The temperature of the bubbler is adjusted by holding the bubbler 717 in a heat bath 704, the temperature of which is controlled with a temperature controller 709. The hydrogen gas vaporized by solvent is conducted to the atomizer 203 through the channel 706. Oxidizing gas 104 is conducted to the premixing chamber 201 through the channel 708. Upstream of the channel 708 the oxidizing gas 104 is conducted through a bubbler 718. The bubbler 718 contains solvent 707 that may the same as or different from the solvent 705. Solvent 707 vaporizes in the oxidizing gas passing through the bubbler 718. The amount of vaporizing solvent depends on the volume flow of the oxidizing gas and the temperature of the bubbler 718. Alternatively, hydrogen gas and oxidizing gas may be premixed with one another and the premixed gas mixture may be used for atomization of the liquid. This alternative is shown in FIG. 7B, in which the hydrogen gas passing in the channel 706B and the oxidizing gas passing in the channel 708B are combined in the channel 710, before the gas mixture sprinkles the liquid passing in the channel 105B. Liquid droplets 202 and gases 706 and 708 mix with one another in the premixing chamber 201. To enhance the mixing, the premixing chamber 201 may comprise tumblers 715 which enhance the mixing of gas streams. A desired vapour pressure 716 of the solvent 705 and/or 706 is generated in the premixing chamber 201. The premixing chamber 201 may be heated or cooled with a heating/cooling jacket 711 that is controlled by a temperature controller 712. It is also possible to introduce an extra gas stream from the channel 719 through a porous wall 714 into the premixing chamber. With the gas stream conducted through the wall 714 it is possible to reduce accumulation of liquid particles 202 on the walls of the chamber 201. An aerosol mixture exiting from the premixing chamber is ignited to generate a flame 108. The discharge opening 719 of the premixing chamber is arranged such that the flow rate of the gas discharged from the opening is higher than the flame propagation rate in the discharging gas mixture, whereby the flame is prevented from burning in the premixing chamber 201. In the flame the droplets and the metallic salts therein evaporate, react, nucleate, condense, agglomerate and/or sinter forming nanoparticles 109.

In accordance with the present invention it is further possible to provide a method for producing nanoparticles. The method produces liquid droplets containing nanoparticle starting materials, and the droplets (202A, 202B) are conducted to a thermal reactor, such as a flame, in which the nanoparticles (109) are generated from the droplets. In the invention, liquid droplets atomized from at least one liquid starting material and combustion and/or oxidizing gases constituting the thermal reactor are intermixed prior to conducting the mixture into the thermal reactor. The thermal reactor may be a flame generated by a combustion gas and an oxidizing gas or plasma provided by means of gas.

The median of the aerodynamic diameter of liquid droplets to be conducted into the flame is provided within the range of 0.1 to 50 micrometers. In addition, liquid droplets having an aerodynamic diameter exceeding 5 to 50 micrometers are removed from the gas stream before the flame.

In the method, gas or vapour participating in at least one nanoparticle generation reaction is mixed into the aerosol particles and the combustion and oxidizing gases providing the flame.

The liquid particles are atomized with a pressure-dispersed atomizer, a gas-dispersed atomizer or a vibrating plate.

Naturally, it is obvious to a person skilled in the art that by combining in a variety of ways the processes, methods and structures described above in connection with various applications of the invention it is possible to provide different uses which fall within the spirit of the invention. Therefore the above examples shall not be understood to restrict the invention, but the embodiments of the invention may vary freely within the scope of the inventive features disclosed in the accompanying claims.

Naturally, it is also obvious to a person skilled in the art that the attached drawings are intended to illustrate the invention and therefore the structures and components appearing therein are not drawn to correct mutual scale.

It is also obvious to a person skilled in the art that the presented geometries are only intended to illustrate the invention and thus, for instance, the shape of the mixing chamber may be arbitrary and the shape of the burner may be freely selected, provided that the geometries employed do not harmfully collect liquid particles, for instance. A perforated burner is an example of a disadvantageous shape, in which surfaces between the perforations may act as impaction collectors of particles.

The invention claimed is:

1. A device for producing nanoparticles, the device comprising means for atomizing liquid, wherein the means is configured to disperse liquid into liquid droplets having the median of the aerodynamic diameter between 0.1-50 micrometers, the produced liquid droplets containing starting materials for nanoparticles, said liquid droplets being conducted to a thermal reactor, where the nanoparticles are generated from the liquid droplets, wherein the liquid droplets and the combustion and/or oxidizing gases constituting the thermal reactor are intermixed prior to conducting the mixture to the thermal reactor, and the device is configured to conduct liquid droplets having the aerodynamic diameter 5 micrometers or less to the thermal reactor.

2. The device according to claim 1, wherein the device comprises means for removing liquid droplets having an aerodynamic diameter that exceeds 5 to 50 micrometers from the gas stream upstream of the thermal reactor.

3. The device according to claim 2, wherein the device comprises an impactor, an electric classifier, an air collector or the like for removing liquid droplets having an aerodynamic diameter that exceeds 5 to 50 micrometers.

4. The device according to claim 2, wherein the device comprises means for heating surfaces in contact with the mixture streams.

5. The device according to claim 1, wherein the thermal reactor is a flame generated by the combustion gas and the oxidizing gas.

6. The device according to claim 1, wherein the thermal reactor is plasma provided by means of gas.

7. The device according to claim 1, wherein the device comprises means for heating walls of the device such that the liquid component of droplets drifting onto the wall will evaporate completely or partly and the salt contained in the liquid adheres to the heated surface.

8. The device according to claim 1, wherein the device comprises means for mixing at least one gas or vapour participating in a nanoparticle generation reaction with aerosol particles and the combustion and oxidizing gases generating the flame.

9. The device according to claim 1, wherein the device comprises means for vaporizing a solvent used in liquid droplets necessary for nanoparticle generation into at least one gas to be introduced into the premixing chamber of the device.

10. The device according to claim 1, wherein the device comprises a pressure-dispersed atomizer, a gas-dispersed atomizer or a vibrating plate for atomizing liquid particles.

11. The device according to claim 1, wherein the device in provided such that the discharge rate of the aerosol exiting from the premixing chamber is higher than the flame front propagation rate in said aerosol.

12. A method for producing nanoparticles, wherein nanoparticles are produced with the device in accordance with claim 1.

13. An apparatus for dyeing a surface of flat glass, for manufacturing a photocatalytic surface, for manufacturing an optical fiber perform, or for coating a ceramic, glass or metallic piece, wherein the apparatus comprises the device according to claim 1.

* * * * *